US 9,950,739 B2

(12) United States Patent
Watanabe et al.

(10) Patent No.: US 9,950,739 B2
(45) Date of Patent: Apr. 24, 2018

(54) VEHICLE CIRCUMFERENCE MONITORING APPARATUS

(71) Applicant: AISIN SEIKI KABUSHIKI KAISHA, Kariya-shi, Aichi-ken (JP)

(72) Inventors: Kazuya Watanabe, Anjo (JP); Tetsuya Maruoka, Okazaki (JP); Itsuko Ohashi, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 14/953,096

(22) Filed: Nov. 27, 2015

(65) Prior Publication Data

US 2016/0152264 A1 Jun. 2, 2016

(30) Foreign Application Priority Data

Nov. 28, 2014 (JP) .................................. 2014-241652

(51) Int. Cl.
| | |
|---|---|
| *B62D 15/02* | (2006.01) |
| *B60R 1/00* | (2006.01) |
| *G07C 5/08* | (2006.01) |

(52) U.S. Cl.
CPC .............. *B62D 15/021* (2013.01); *B60R 1/00* (2013.01); *B62D 15/0295* (2013.01); *G07C 5/08* (2013.01); *B60R 2300/304* (2013.01); *B60R 2300/70* (2013.01); *B60R 2300/8086* (2013.01)

(58) Field of Classification Search
None
See application file for complete search history.

(56) References Cited

U.S. PATENT DOCUMENTS

| 7,248,283 | B2 | 7/2007 | Takagi et al. |
| 8,694,195 | B2* | 4/2014 | Lee ........................... B60R 1/00 340/436 |
| 8,694,224 | B2* | 4/2014 | Chundrlik, Jr. ... B60W 50/0098 180/233 |
| 2003/0090570 | A1* | 5/2003 | Takagi ...................... B60R 1/00 348/148 |
| 2010/0066833 | A1* | 3/2010 | Ohshima ................... B60R 1/00 348/148 |

(Continued)

FOREIGN PATENT DOCUMENTS

| EP | 2 163 431 A1 | 3/2010 |
| JP | 3607994 B2 | 1/2005 |

OTHER PUBLICATIONS

Communication dated Mar. 18, 2016 from European Patent Office in counterpart Application No. 15196717.1.

*Primary Examiner* — Krishnan Ramesh
(74) *Attorney, Agent, or Firm* — Sughrue Mion, PLLC (57) ABSTRACT

A vehicle circumference monitoring apparatus includes: an acquisition section that acquires a steering angle of front wheels of a vehicle; a trajectory calculation section that calculates a rear wheel width trajectory indicating a moving predicted path of a rear wheel of an inside of turning during turning of the vehicle by steering of the front wheels; and a display control section that superimpose-displays the rear wheel width trajectory in captured side image data output from an imaging section that captures side images of the vehicle when the steering angle of the vehicle is equal to or greater than a predetermined value.

17 Claims, 8 Drawing Sheets

(56) References Cited

U.S. PATENT DOCUMENTS

| | | | |
|---|---|---|---|
| 2011/0025489 A1* | 2/2011 | Shimoda | B60R 1/00 340/459 |
| 2012/0158256 A1* | 6/2012 | Kuboyama | B62D 15/0275 701/51 |
| 2013/0231825 A1* | 9/2013 | Chundrlik, Jr. | B60W 50/0098 701/29.1 |
| 2014/0218507 A1* | 8/2014 | Watanabe | B60K 35/00 348/116 |
| 2014/0229068 A1* | 8/2014 | Ueyama | B62D 15/0255 701/41 |
| 2015/0197197 A1* | 7/2015 | Watanabe | B60R 1/00 348/118 |
| 2016/0094807 A1* | 3/2016 | Fujio | H04N 7/183 348/148 |
| 2016/0251030 A1* | 9/2016 | Okada | B62D 15/0295 345/633 |

* cited by examiner

VEHICLE CIRCUMFERENCE MONITORING APPARATUS

CROSS REFERENCE TO RELATED APPLICATIONS

This application is based on and claims priority under 35 U.S.C. § 119 to Japanese Patent Application 2014-241652, filed on Nov. 28, 2014, the entire contents of which are incorporated herein by reference.

TECHNICAL FIELD

This disclosure relates to a vehicle circumference monitoring apparatus.

BACKGROUND DISCUSSION

In the related art, as a technique for supporting driving operation of a vehicle, a technique for supporting driving operation of a driver by imaging a circumferential environment of the vehicle by an imaging device such as a camera mounted on the vehicle and displaying captured image data as an imaging result has been proposed. As one type of driving support, there is a driving support in which a passage predicted line of wheels is superimpose-displayed on the captured image data. For example, turning radii of a front inner wheel and a rear inner wheel are different from each other due to an inner wheel difference occurring during turning of the vehicle. Thus, a circumference monitoring apparatus, in which the passage predicted line of the rear wheel that is hardly recognized by the driver or a passage predicted line when operating a steering wheel at the maximum angle is superimpose-displayed, has been proposed.

Japanese Patent No. 3607994 is an example of the related art.

However, since the passage predicted line of the rear wheel is displayed whenever performing the operation of the steering wheel, the display is performed even during a slight operation of the steering wheel. As a result, a user would feel inconvenience. In addition, whether or not the rear wheel comes into contact with an object such as a curbstone is easily determined by referring to a display of the passage predicted line, but there is a case where the determination of which object (for example, stone) the rear wheel runs over cannot be performed smoothly, for example, during driving off-road.

SUMMARY

A vehicle circumference monitoring apparatus according to an aspect of this disclosure includes, for example, an acquisition section that acquires a steering angle of front wheels of a vehicle; a trajectory calculation section that calculates a rear wheel width trajectory indicating a moving predicted path of a rear wheel of an inside of turning during turning of the vehicle by steering of the front wheels; and a display control section that superimpose-displays the rear wheel width trajectory in captured side image data output from an imaging section that captures side images of the vehicle when the steering angle of the vehicle is equal to or greater a predetermined value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an example, in which a vehicle circumference monitoring apparatus of an embodiment is mounted on a vehicle 1, will be described. In the embodiment, the vehicle 1 may be, for example, an automobile (internal combustion engine automobile) in which an internal combustion engine (engine (not illustrated)) is a driving source or an automobile (electric automobile, a fuel cell automobile, and the like) in which an electric motor (motor (not illustrated)) is a driving source. In addition, the vehicle 1 may be an automobile (hybrid electric vehicle) in which both are the driving source. In addition, the vehicle 1 is able to mount various transmissions and is able to mount various devices (systems, parts, and the like) necessary for driving the internal combustion engine or the electric motor. In addition, a type, the number, a layout, and the like of a device for driving wheels 3 in the vehicle 1 can be variously set.

Figure 1:
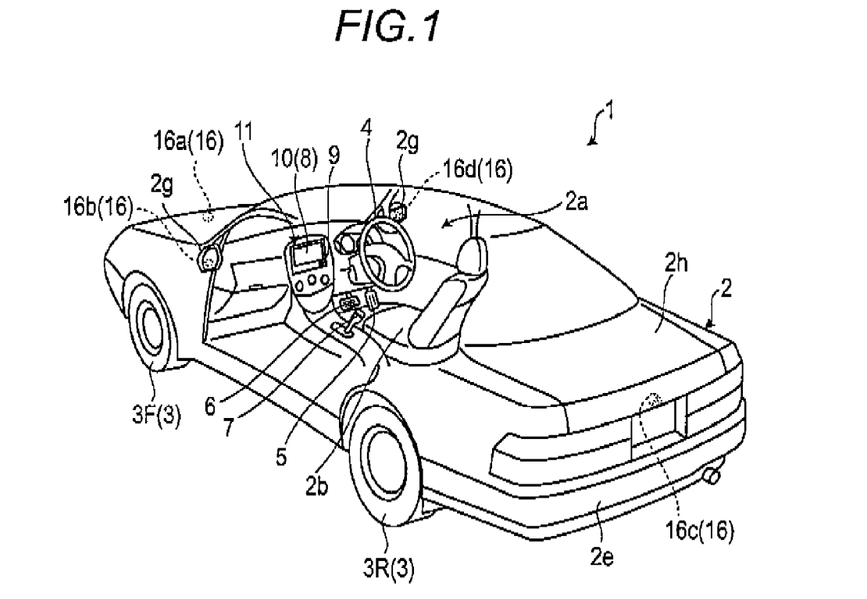
FIG. 1 is a perspective view illustrating an example of a state where a part of a vehicle interior of a vehicle on which a vehicle circumference monitoring apparatus according to an embodiment is mounted is viewed.

As illustrated in FIG. 1, a vehicle body 2 according to the embodiment is configured of a vehicle interior 2a where an occupant (not illustrated) rides. A steering section 4, an acceleration operation section 5, a braking operation section 6, a speed change operation section 7, and the like are provided within the vehicle interior 2a in a state of facing a seat 2b of a driver as the occupant. In the embodiment, for example, the steering section 4 is a steering wheel protruding from a dashboard (instrument panel) and the acceleration operation section 5 is an accelerator pedal positioned below the feet of the driver. In addition, the braking operation section 6 is a brake pedal positioned below the feet of the driver and the speed change operation section 7 is a shift lever protruding from a center console. However, these are not limited to the embodiment.

In addition, a display device 8 (display output section) and a sound output device 9 (sound output section) are provided within the vehicle interior 2a. The display device 8 is, for example, a liquid crystal display (LCD), an organic electroluminescent display (GELD), and the like. The sound output device 9 is, for example, a speaker. In addition, in the embodiment, for example, the display device 8 is covered by a transparent operation input section 10 (for example, a touch panel and the like). The occupant and the like can visually recognize a video (image) displayed on a display screen of the display device S via the operation input section 10. In addition, the occupant and the like can execute an operation input (instruction input) by operating the operation input section 10 by touching, pressing, or moving the operation input section 10 with the finger or the like in a position corresponding to the video (image) displayed on the display screen of the display device 8. In addition, in the embodiment for example, the display device 8, the sound output device 9, the operation input section 10, and the like are provided in a monitor device 11 positioned at a center portion of the dashboard in a vehicle width direction (right and left direction). The monitor device 11 can have an operation input section (not illustrated) such as switches, dials, joysticks, and push buttons. In addition, a sound output device (not illustrated) can be provided in a position within the vehicle interior 2a different from the position of the monitor device 11 and sound can be output from the sound output device 9 of the monitor device 11 and another sound output device. In addition, in the embodiment, for example, the monitor device 11 is also used as a navigation system and an audio system, but the monitor device for the vehicle circumference monitoring apparatus may be provided separately from these systems.

Figure 2:
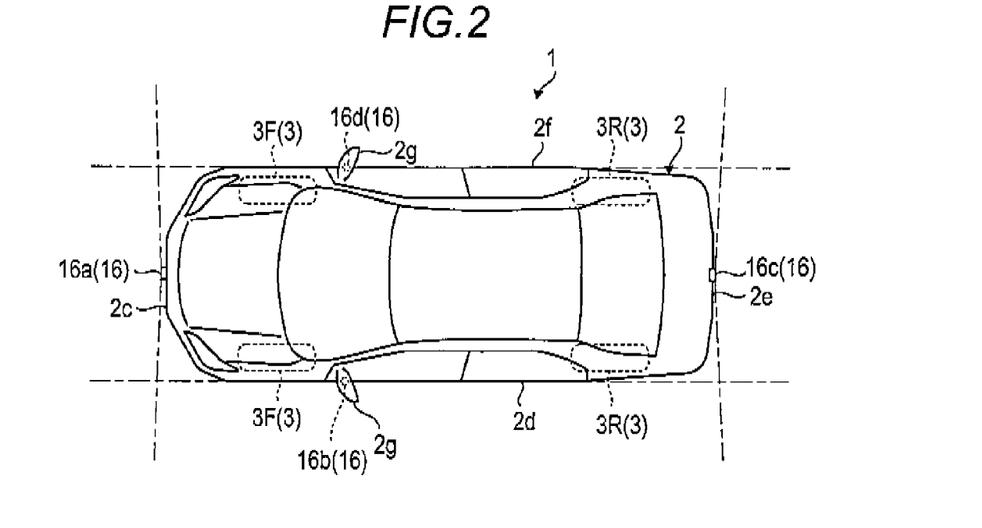
FIG. 2 is a plan view (overhead view) illustrating an example of the vehicle on which the vehicle circumference monitoring apparatus according to the embodiment is mounted.
Figure 3:
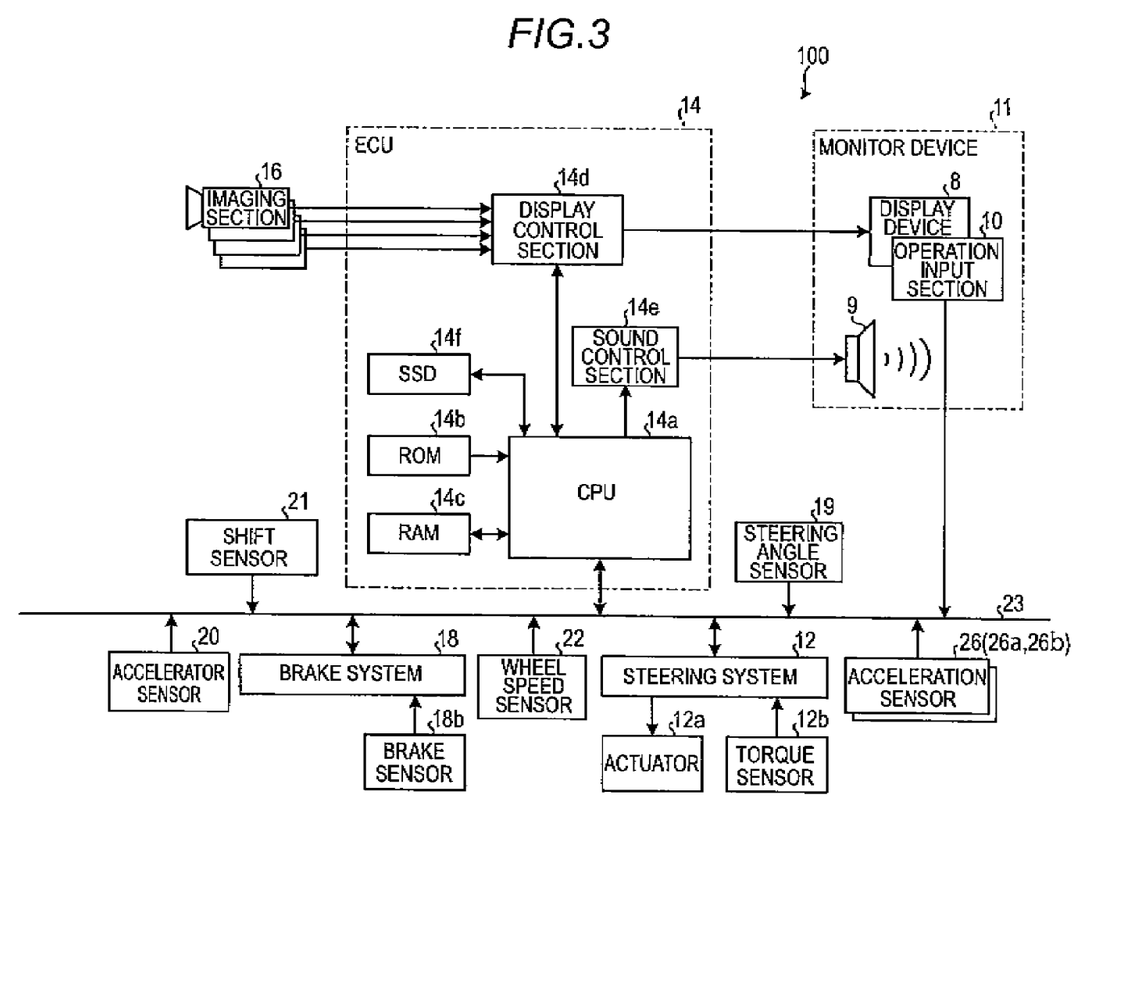
FIG. 3 is a block diagram illustrating an example of an image control system including the vehicle circumference monitoring apparatus according to the embodiment.

In addition, as illustrated in FIGS. 1 and 2, in the embodiment, for example, the vehicle 1 is a four-wheel vehicle (four-wheeled automobile) and has two right and left front wheels 3F and two right and left rear wheels 3R. Then, for example, a tire angle of the front wheel 3F is changed (steered) in compliance with an operation of the steering section 4 (steering wheel). A steering system 12 (see FIG. 3) is, for example, an electric power steering system, a steer by wire (SBW) system, and the like. As illustrated in FIG. 3, the steering system 12 compensates a steering force by adding torque (assist torque) to the steering section 4 by an actuator 12a and steers the front wheels 3F.

In addition, in the embodiment, for example, as illustrated in FIG. 2, a plurality (for example, four in the embodiment) of imaging sections 16 (16a to 16d) are provided in the vehicle 1 (vehicle body 2). The imaging section 16 is a digital camera in which an imaging device such as a charge coupled device (CCD) and a CMOS image sensor (CIS) is built. The imaging section 16 can output captured image data (moving image data and frame data) at a predetermined frame rate. The imaging sections 16 respectively have a wide-angle lens and can image (capture an image) an image, for example, at a range (viewing angle) of 140° to 220° in the horizontal direction. In addition, an optical axis of the imaging section 16 is set downward (for example, a vertical direction or an obliquely downward direction). Thus, the imaging section 16 can image an environment of an outside of the circumference of the vehicle body 2 including a road surface on which the vehicle 1 is able to move and a region above the road surface.

In the embodiment, for example, the imaging section 16a functioning as a first imaging section is positioned in an end portion 2c (end portion in a plan view) of a front side (front side in a longitudinal direction of the vehicle) of the vehicle body 2 and is provided on a front grille and the like. The imaging section 16b functioning as a second imaging section is positioned in an end portion 2d of a left side (left side in the vehicle width direction) of the vehicle body 2 and is provided on a door mirror 2g (protrusion portion) of the left side. In addition, the imaging section 16c functioning as the first imaging section is positioned in an end portion 2e on a rear side (rear side in the longitudinal direction of the vehicle) of the vehicle body 2 and is provided on a wall portion below a door 2h of a rear trunk. The imaging section 16d functioning as the second imaging section is positioned in an end portion 2f of a right side (right side in the vehicle width direction) of the vehicle body 2 and is provided on the door mirror 2g (protrusion portion) of the right side. In addition, in the embodiment, a mounting method of the camera is not limited and may be provided so as to acquire captured image data in a front direction, captured image data in a right-left side direction, and captured image data in a rear direction with respect to the vehicle 1.

An electronic control unit (ECU; see FIG. 3) 14 executes a calculating process and an imaging process based on the captured image data acquired by the plurality of the imaging sections 16 and displays the captured image data in which the imaging process is performed on the display device 8.

In addition, in the embodiment, for example, as illustrated in FIG. 3, in a circumference monitoring system (vehicle circumference monitoring apparatus) 100, a brake system 18, a steering angle sensor 19 (angle sensor), an accelerator sensor 20, a shift sensor 21, a wheel speed sensor 22, an acceleration sensor 26, and the like are electrically connected via an in-vehicle network 23 (electric communication line) in addition to the ECU 14, the monitor device 11, and the like. The in-vehicle network 23 is configured as, for example, a controller area network (CAN). The ECU 14 can control the brake system 18 and the like by transmitting a control signal through the in-vehicle network 23. Furthermore, the ECU 14 can receive detection results of a torque sensor 12b, a brake sensor 18b, the steering angle sensor 19, the accelerator sensor 20, the shift sensor 21, the wheel speed sensor 22, the acceleration sensor 26, and the like via the in-vehicle network 23. In addition, the ECU 14 can receive instruction signals (a control signal, an operation signal, an input signal, and data) of the operation input section 10 and the like.

In the embodiment, two acceleration sensors 26 (26a and 26b) are provided in the vehicle 1. Moreover, in the embodiment, the vehicle 1 is a vehicle on which an electronic stability control (ESC) is mounted. Then, the acceleration sensors 26 (26a and 26b) of the related art mounted on the vehicle on which the ESC is mounted are used. Moreover, in the embodiment, the acceleration sensor is not limited and a sensor that is able to detect the acceleration of the vehicle 1 in the right and left direction may be used.

The ECU 14 has, for example, a central processing unit (CPU) 14a, a read only memory (ROM) 14b, a random access memory (RAM) 14c, a display control section 14d, a sound control section 14e, a solid state drive (SSD, flash memory) 14f, and the like. The CPU 14a executes various calculating processes such as the imaging process associated with an image displayed on the display device 8, calculation of a moving path of the vehicle 1, and determination of the presence or absence of interference with an object. The CPU 14a reads a program stored (installed) in a non-volatile storage device such as the ROM 14b and executes the calculating process in compliance with the related program.

The RAM 14c temporarily stores various data that are used in the calculation in the CPU 14a. In addition, the display control section 14d mainly executes the imaging process using the captured image data obtained by the imaging section 16, the imaging process (for example, synthesizing and the like) of the captured image data displayed on the display device 8, and the like in the calculating process in the ECU 14. In addition, the sound control section 14e mainly executes a process for sound data output from the sound output device 9 in the calculation process in the ECU 14. In addition, the SSD 14f is a rewritable non-volatile storage section and can store data even if a power supply of the ECU 14 is turned off. Moreover, the CPU 14a, the ROM 14b, the RAM 14c, and the like can be integrated within the same package. In addition, the ECU 14 may be a configuration in which other logical calculation processors such as a digital signal process (DSP), a logical circuit, and the like are used instead of the CPU 14a. In addition, a hard disk drive (HDD) may be provided instead of the SSD 14f and the SSD 14f or the HOD may be provided separately from the ECU 14.

Figure 4:
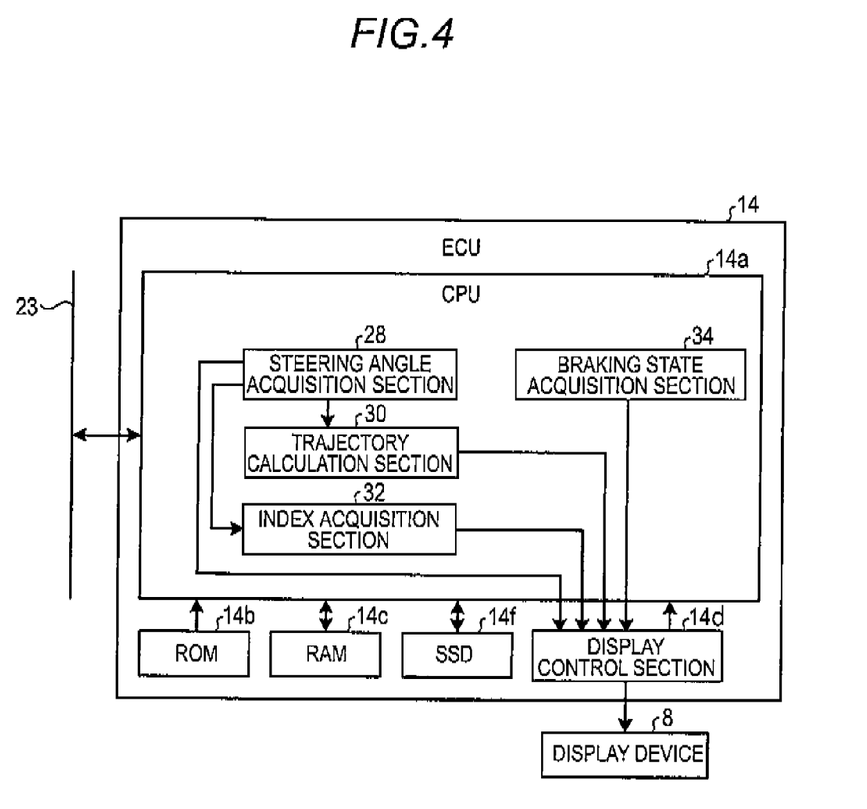
FIG. 4 is a block diagram illustrating a configuration of an image processing section that is realized within an ECU of the vehicle circumference monitoring apparatus according to the embodiment.

As illustrated in FIG. 4, the CPU 14a includes various modules that read programs installed and stored in a storage device such as the ROM 14b, and are realized by executing the programs. The CPU 14a includes, for example, a steering angle acquisition section 28, a trajectory calculation section 30, an index acquisition section 32, a braking state acquisition section 34, and the like as modules associated with display control of the side image in the embodiment.

The steering angle acquisition section 28 acquires a detection result of the steering angle sensor 19 supplied via the in-vehicle network 23 and calculates the steering angle of the front wheels 3F. The acquired steering angle is supplied to the trajectory calculation section 30, the index acquisition section 32, the display control section 14d, and the like. The trajectory calculation section 30 calculates the rear wheel width trajectory indicating the moving predicted path of the rear wheel 3R on the inside of turning during turning of the vehicle 1 by steering of the front wheels 3F on the basis of the steering angle supplied from the steering angle acquisition section 28. In addition, the trajectory calculation section 30 calculates the front wheel width trajectory indicating the moving predicted path of the front wheels 3F of the vehicle 1 on the basis of the steering angle supplied from the steering angle acquisition section 28. The calculated rear wheel width trajectory or the front wheel width trajectory is supplied to the display control section 14d and is superimpose-displayed on a circumference image of the vehicle 1 that is captured by the imaging section 16.

The index acquisition section 32 reads an index indicating the exterior information of the vehicle 1 stored in a storage device such as the SSD 14f based on the steering angle supplied from the steering angle acquisition section 28 and supplies the index to the display control section 14d. As the index indicating the exterior information of the vehicle 1, for example, information indicating a vehicle width of the vehicle 1, information indicating the grounding position of the wheel 3, information indicating a distance of the front of the vehicle, and the like are included. A detailed index will be described later.

The braking state acquisition section 34 acquires the information indicating the braking control state from the brake system 18 via the in-vehicle network 23 and supplies the information to the display control section 14d. A braking device (for example, a disc brake device) mounted on each wheel 3 of the vehicle 1 is able to perform braking control for each wheel 3. For example, it is possible to perform anti-lock brake control for lowering or eliminating a braking force of the wheel 3 that is temporarily locked if the wheel 3 is locked. It is possible to reduce the turning radius by generating the braking force to the rear wheel on the inside of turning by using the function. That is, it is possible to move the rear wheels 3R based on a moving trajectory (trajectory of which the turning radius is small) different from a rear wheel width trajectory 36 calculated based on the steering angle. If such the braking control is performed, the display control section 14d can alert the user by changing the display mode of the rear wheel width trajectory 36. Specific examples of the change of the display mode of the rear wheel width trajectory 36 will be described later.

The display control section 14d determines an additional image superimposed on the circumference image of the vehicle 1 supplied from the imaging section 16 based on the rear wheel width trajectory or the front wheel width trajectory supplied from the trajectory calculation section 30, the index supplied from the index acquisition section 32, braking control information supplied from the braking state acquisition section 34, and the like. Then, the additional image and the circumference image are output and displayed on the display device 8 by merging the additional image and the circumference image. Moreover, modules realized within the CPU 14a may be individually configured for each function as described above, or may be one module in which a plurality of functions are collected. In contrast, the module may be realized by further subdividing the functions.

Figure 5:
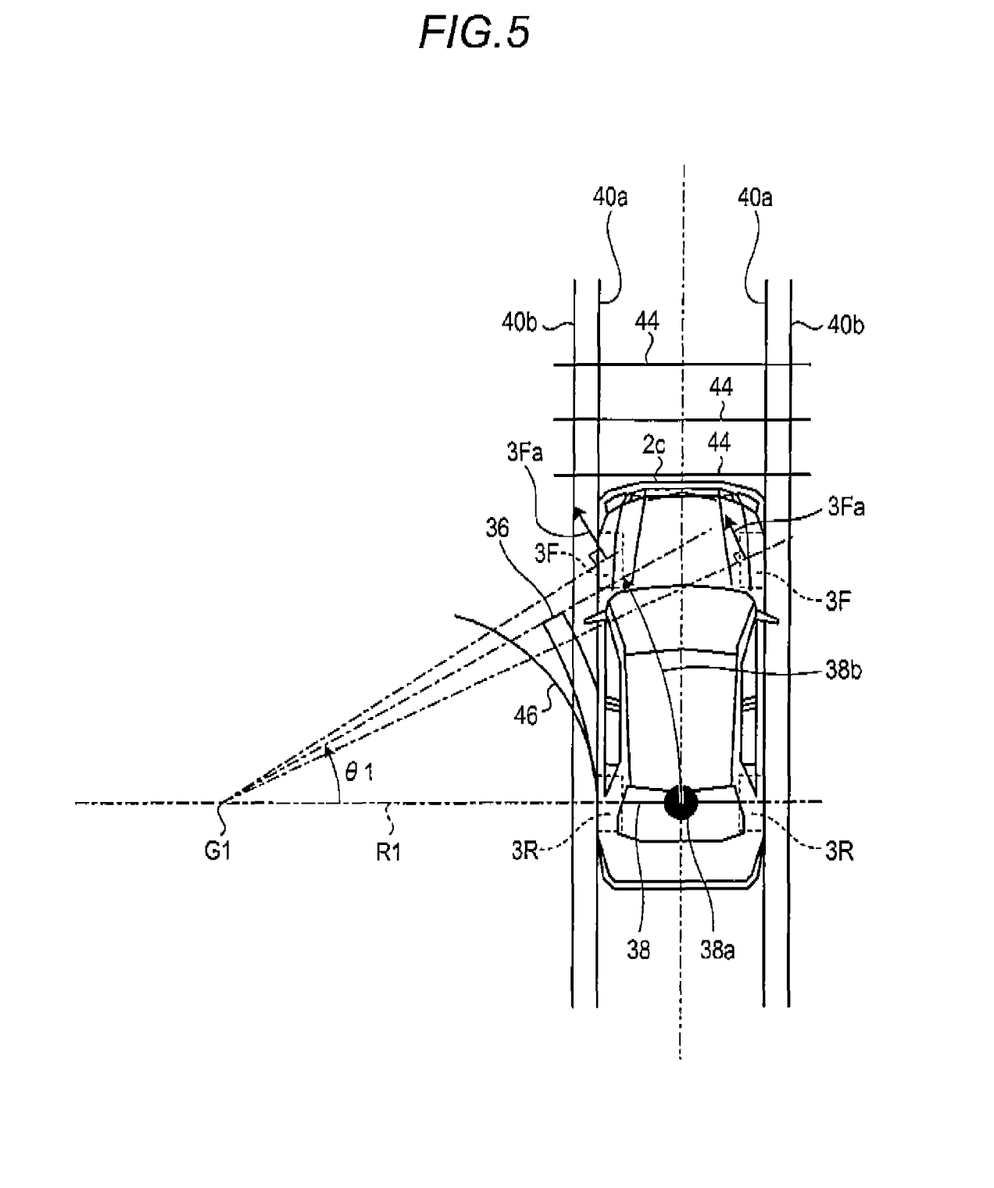
FIG. 5 is an explanatory view illustrating a calculation example of a case where a rear wheel width trajectory is calculated in the vehicle circumference monitoring apparatus according to the embodiment.

An example of a calculation procedure of the rear wheel width trajectory 36 will be described with reference to FIG. 5. If the steering angle of the front wheels 3F is changed by operating the steering section 4 (steering wheel), a turning center G1 of the vehicle 1 exists at an intersection point of a direction orthogonal to an orientation 3Fa of the front wheel 3F and an extension direction of a rear wheel axle 38 supporting the rear wheels 3R. That is, when the vehicle 1 turns according to the steering angle of the front wheels 3F, a center point 38a of the rear wheel axle 38 also moves along a circular arc of which a center is the turning center G1. In addition, the rear wheels 3R also move along the circular arc of which the center is the turning center G1. As described above, if the turning is performed in a normal driving such as a case where the braking force is applied to the rear wheels 3R or slip does not occur, the rear wheel width trajectory 36 of the rear wheels 3R is uniquely determined based on the steering angle of the front wheels 3F. In this case, since the orientation indicated by the rear wheel width trajectory 36 is changed every moment depending on the change of the steering angle, if a display length of the rear wheel width trajectory 36 is too long, a shake amount of the rear wheel width trajectory 36 on a leading end side is increased, the moving predicted path is unlikely to be understood, and the user may feel uncomfortable and inconvenience. In contrast, if the display length of the rear wheel width trajectory 36 is too short, the moving direction of the rear wheels 3R superimposed on a portion of a vehicle side of the vehicle 1 is unlikely to be grasped. Then, the trajectory calculation section 30 of the embodiment displays the rear wheel width trajectory 36 of a length corresponding to a moving amount of the center point 38a that is moved by a predetermined distance during turning. For example, the rear wheel width trajectory 36 is displayed in a case where the center point 38a moves by a predetermined distance 38b of 2.0 m on the circular arc of a radius R1 around the turning center G1 during turning. In this case, when a turning angle of the vehicle 1 is θ1, the display length of the rear wheel width trajectory 36 can be calculated.

Moreover, a situation where an attention is to be focused on conditions of the road surface where the rear wheels 3R pass through, is for example, considered as a case when driving on a rough road such as an off-road at low speed. Thus, even if the steering angle is changed, it is preferable that the display length of the rear wheel width trajectory 36, in which a shake width of the rear wheel width trajectory 36 that is displayed every time is reduced and a traveling direction of the rear wheels 3R can be sufficiently predicted, is determined. As a result of repeated experiments in view of theses points, for example, a result was obtained in which it is preferable that the moving distance of the center point 38a of the rear wheel axle 38 described above is 2.0 m. However, the display length of the rear wheel width trajectory 36 is not limited to the example described above and may be appropriately changed. The display length of the rear wheel axle 38 may be initially set and fixed or may be set by using the operation input section 10 and the like by the user.

In the embodiment, the rear wheel width trajectory 36 is displayed so as to correspond to an actual width of the rear wheel 3R and is superimposed on the side image that is captured by the imaging section 16b (imaging section 16d). Thus, the user can easily understand which uneven portion of the road surface the rear wheels 3R pass through, the degree of the influence to be received when the rear wheels 3R run over the unevenness of the road surface, and the like. Thus, the trajectory calculation section 30 can acquire information of the wheel width of the rear wheel 3R and the like and if the rear wheel 3R is exchanged, a display width of the rear wheel width trajectory 36 may be also changed in compliance with an actual width of the rear wheel 3R. The change may be reflected on the trajectory calculation section 30 by automatically acquiring the information of the wheel 3 or may be input via the operation input section 10 and the like by the user.

The trajectory calculation section 30 may also calculate the front wheel width trajectory indicating the moving predicted path of the front wheels 3F of the vehicle 1. In addition, the display control section 14d may superimpose-display the front wheel width trajectory on captured front image data output from the imaging section 16a that captures the front image of the vehicle 1. The front wheel width trajectory can be displayed as an index indicating a direction facing the front wheel 3F based on the steering angle supplied from the steering angle acquisition section 28. The front wheel width trajectory may be displayed at all times or may be displayed if the steering section 4 (steering wheel) is operated at a predetermined angle or more. In addition, the display length of the front wheel width trajectory may also be a predetermined value such as a length corresponding to, for example, 5 m or may be appropriately set by using the operation input section 10 by the user on a front image on which the front wheel width trajectory is superimposed.

Meanwhile, since the orientation of the rear wheels 3R is always the longitudinal direction of the vehicle, if the vehicle 1 is turned by steering the front wheels 3F, when the steering angle of the front wheels 3F is small, a protrusion amount of the rear wheel width trajectory 36 on the inside of turning is reduced, is substantially superimposed on the side portion of the vehicle 1, and is in a state of being unlikely to be recognized. In addition, troublesome is given to the user that the rear wheel width trajectory 36 that slightly protrudes from the side portion of the vehicle 1 is difficult to be distinguished from a side portion contour line of the vehicle 1 thereby. Thus, if the steering angle of the vehicle 1 supplied from the rear wheel axle 38 is equal to or greater than the predetermined value, the display control section 14d superimpose-displays the rear wheel width trajectory 36 on the captured side image data supplied from the imaging section 16b (imaging section 16d) of the vehicle 1. That is, if the steering angle of the front wheels 3F is increased to a certain extent and a necessity of the display of the moving predicted path of the rear wheels 3R is increased, the rear wheel width trajectory 36 is displayed. As the predetermined value of the steering angle to start the display of the rear wheel width trajectory 36, for example, it is possible to make the steering angle to be 270°. In this case, since the rear wheel width trajectory 36 is displayed by sufficiently being separated from the side portion contour line of the vehicle 1, the moving predicted path of the rear wheels 3R is easily grasped. In addition, it is possible to suppress that troublesome is given to the user that the rear wheel width trajectory 36 is difficult to be distinguished from the side portion contour line of the vehicle 1.

Moreover, if the steering angle is less than 270°, it is considered that the rear wheel 3R substantially passes through the same path as the front wheel 3F. As described above, the display control section 14d can superimpose-display the front wheel width trajectory of the front wheel 3F on the front image. Thus, even if the steering angle is less than the predetermined value and the rear wheel width trajectory 36 is not displayed, the user can estimate the moving predicted path of the rear wheel 3R by confirming the front wheel width trajectory. Moreover, if the steering angle is less than the predetermined value, the trajectory calculation section 30 may not perform the calculation of the rear wheel width trajectory 36 or even if the steering angle is less than the predetermined value, may perform the calculation thereof. If the steering angle is less than the predetermined value, when the calculation of the rear wheel width trajectory 36 is not performed, it is possible to reduce a processing load of the CPU 14a. In contrast, if the steering angle is calculated at all times, when the steering angle is equal to or greater than the predetermined value, it is possible to quickly execute the superimpose-display. In addition, even if the steering angle is less than the predetermined value, when the user wants to perform the superimpose-display of the rear wheel width trajectory 36, it is possible to quickly perform the superimpose-display. Moreover, the steering angle (for example, 270°) in which the display of the rear wheel width trajectory 36 is started is an example and the user may appropriately set and change the steering angle via the operation input section 10 and the like.

Moreover, if the steering angle is less than the predetermined value and the rear wheel width trajectory 36 is not displayed, the display control section 14d may superimpose-display the index indicating the exterior information of the vehicle 1 on the captured side image data that is captured by the imaging section 16b (imaging section 16d). As described above, the index indicating the exterior information of the vehicle 1 is, for example, information indicating the vehicle width of the vehicle 1, information indicating the grounding position of the wheel 3, information indicating the distance of the vehicle front, and the like. The information indicating the vehicle width of the vehicle 1 is a vehicle width line 40a indicating the vehicle width, a vehicle width offset line 40b that is offset from the vehicle width line 40a in an outside direction of the vehicle width by, for example, 0.35 m, and the like. A relationship between the vehicle 1 and the circumference, for example, presence or absence of contact and appropriateness of an interval can be easily grasped by the user by displaying the vehicle width line 40a, the vehicle width offset line 40b, and the like. In addition, a grounding line 42 (see FIG. 6) indicating the grounding position of the wheel 3 is displayed on, for example, the vehicle width offset line 40b and is displayed so as to easily grasp a correspondence between the vehicle width of the vehicle 1 and the grounding position of the wheel 3. In addition, a plurality of interval lines 44 indicating the distance of the vehicle front are displayed, for example, at predetermined intervals relative to the end portion 2c of the front of the vehicle 1 and front distance feeling of the vehicle 1 is easily understood. In addition, a part of the interval lines 44 may also be displayed on the side screen. Since the indexes are fixed lines with respect to the vehicle 1, even if the indexes are displayed at all times, inconvenience and discomfort are not given to the user.

If the rear wheel width trajectory 36 is not displayed, that is, if the steering angle is less than the predetermined value, the indexes of the vehicle width line 40a, the vehicle width offset line 40b, the grounding line 42, the interval line 44, and the like may be displayed instead of the rear wheel width trajectory 36. In addition, in another embodiment, even after the steering angle is equal to or greater than the predetermined value and the rear wheel width trajectory 36 is displayed, the indexes may be displayed together with the rear wheel axle 38. If one of the index and the rear wheel width trajectory 36 is selectively displayed, it is possible to highlight each display and it is possible to be easily recognized by the user. On the other hand, when displaying the index even after the rear wheel width trajectory 36 is displayed, there is an effect that the relationship between the moving predicted path of the rear wheel 3R and the exterior of the vehicle 1 is easily understood.

If the steering angle is equal to or greater than the predetermined value based on the steering angle supplied from the steering angle acquisition section 28, that is, if the superimpose-display of the rear wheel width trajectory 36 is performed, the index acquisition section 32 may acquire a maximum moving trajectory 46 from the SSD 14f. The maximum moving trajectory 46 is the moving predicted path of the rear wheel 3R on the inside of turning if the steering angle is a maximum angle and is temporarily determined based on the maximum steering angle. Similar to the rear wheel width trajectory 36, the maximum moving trajectory 46 can be superimpose-displayed on the captured side image data. It is preferable that the maximum moving trajectory 46 is displayed in a display mode different from the rear wheel width trajectory 36 so as to easily identify the maximum moving trajectory 46 from the rear wheel width trajectory 36. The maximum moving trajectory 46 is mainly used for grasping whether or not the rear wheels 3R come into contact with an object, for example, a curbstone and the like on the side of the vehicle 1. Thus, the maximum moving trajectory 46 may be displayed as the outermost line of the rear wheel 3R. In addition, the maximum moving trajectory 46 and the rear wheel width trajectory 36 may be displayed with different display colors or, for example, the maximum moving trajectory 46 is blink-displayed and then may be highlighted.

Figure 6:
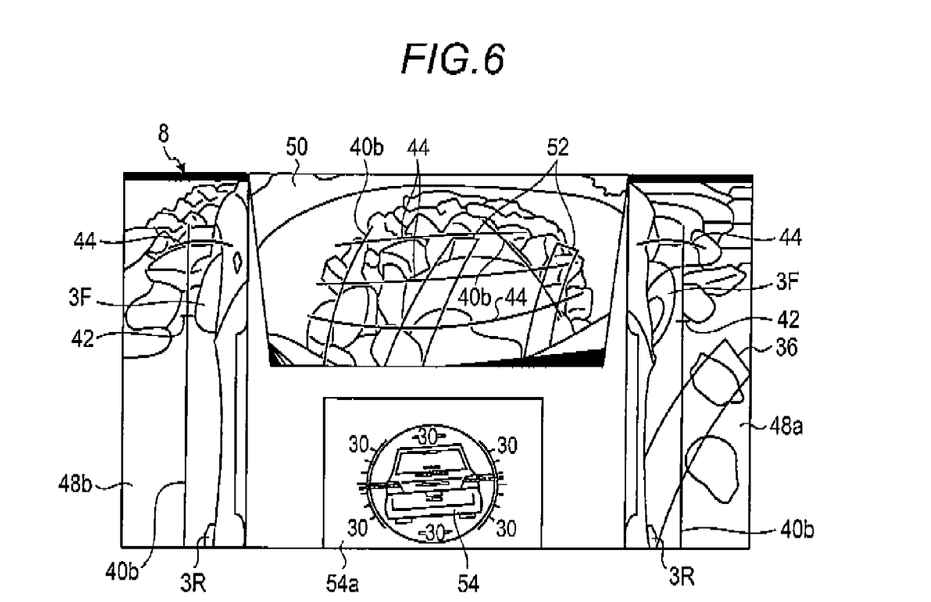
FIG. 6 is a display example illustrating a case where a steering angle is equal to or greater than a predetermined value in the vehicle circumference monitoring apparatus according to the embodiment and is a display example illustrating a state where the rear wheel width trajectory is superimposed on a side image and a front wheel width trajectory is superimposed on a front image.

FIG. 6 is a display example of the display device 8 when the steering angle is equal to or greater than the predetermined value and is a display example illustrating a state where the rear wheel width trajectory 36 is superimpose-displayed on a right-side image region 48a and a front wheel width trajectory 52 is superimpose-displayed on a front image region 50. In the display example of FIG. 6, the right-side image region 48a is assigned from a right upper end to a lower end of the display region of the display device 8 and a left-side image region 48b is assigned from a left upper end to a lower end of the display region. The right-side image region 48a and the left-side image region 48b are vertically long display regions so as to display the front wheels 3F and the rear wheels 3R (part). In addition, the front image region 50 is assigned in a center upper portion interposed between the right-side image region 48a and the left-side image region 48b. Furthermore, a posture symbol display region 54a displaying a posture symbol 54 indicating a posture of the vehicle 1 is assigned in a center lower portion interposed between the right-side image region 48a and the left-side image region 48b.

FIG. 6 illustrates a state where the steering section 4 (steering wheel) is steered equal to or greater than 270° in the right direction and the rear wheel width trajectory 36 is superimpose-displayed on the right-side image region 48a. In addition, FIG. 6 illustrates an example in which the vehicle width offset line 40b, the grounding line 42 of the front wheel 3F, the interval line 44 (interval line 44 that is closest to the end portion 2c of the vehicle 1), and the like are superimpose-displayed together with the rear wheel width trajectory 36. On the other hand, the vehicle width offset line 40b, the grounding line 42, and the interval line 44 are superimpose-displayed on the left-side image region 48b in an opposite direction of the steering direction. The front wheel width trajectories 52, the plurality of the interval lines 44, the right and left vehicle width offset lines 40b, and the like are displayed on the front image region 50. In addition, since the imaging section 16a imaging the front image displayed on the front image region 50 uses the wide-angle lens, the front image and the front wheel width trajectories 52, the interval lines 44, the vehicle width offset line 40b, and the like which are superimpose-displayed thereon are displayed in a shape that is slightly curved. A display posture of the posture symbol 54 is changed corresponding to a roll angle or a pitch angle of the vehicle 1 that can be calculated based on data of the acceleration sensors 26 acquired via the in-vehicle network 23 by the CPU 14a. As a result, the user can be supported so as to objectively and easily understand the posture of the vehicle 1.

As described above, if the steering angle is equal to or greater than the predetermined value (for example, 270°), the moving predicted path of the rear wheel 3R is easily grasped by superimpose-displaying the rear wheel width trajectory 36 of a width corresponding to the wheel width of the rear wheel 3R on the side image even if confirmation of an entire shape or confirmation of a position of the rear wheel 3R is visually difficult on the screen of the display device 8. In addition, if turning of the rear wheel 3R is continued, grasping of the road surface on which the rear wheels 3R will run over is easily performed and it is possible to realize the driving support so as to appropriately perform a change in the path, an adjustment of the speed, and the like.

Figure 7:
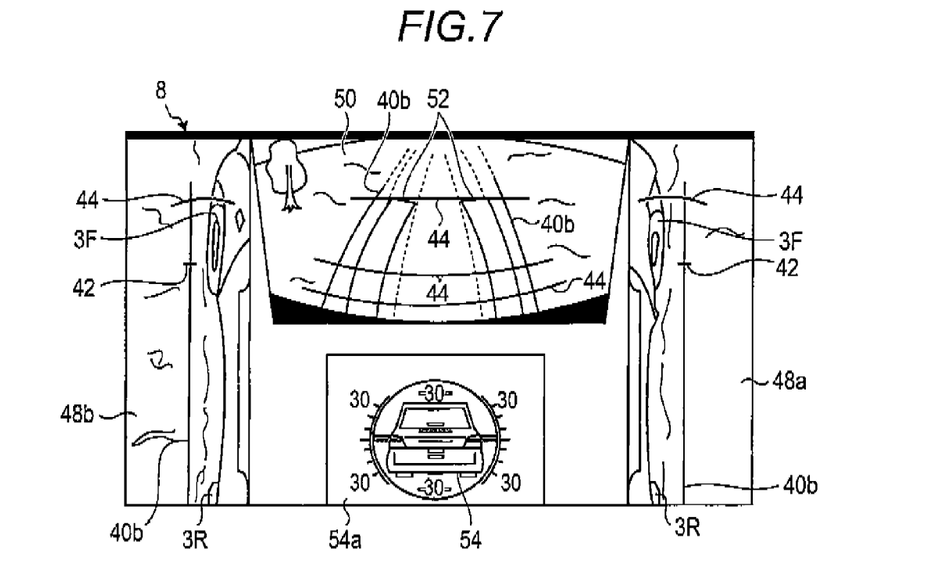
FIG. 7 is a display example illustrating a display device of a case where the steering angle is less than the predetermined value in the vehicle circumference monitoring apparatus according to the embodiment and is a display example illustrating a state where an index indicating an exterior of the vehicle is superimposed on the side image and the front wheel width trajectory is superimposed on the front image.

FIG. 7 is a display example when the steering angle is less than the predetermined value in which the rear wheel width trajectory 36 is not displayed, and the vehicle width offset lines 40b, the grounding lines 42, the interval lines 44, and the like that are the indexes indicating the exterior information of the vehicle 1 are superimpose-displayed on the right-side image region 48a and the left-side image region 48b. In addition, the vehicle width offset lines 40b and the interval lines 44 are superimpose-displayed together with the front wheel width trajectory 52 on the front image region 50. FIG. 7 illustrates a case of driving on ruts on a road covered with snow. In this case, it is possible to easily realize safe driving and to perform favorable driving support by steering so as to match the front wheel width trajectory 52 and the ruts. In addition, when driving on the ruts or the off-road, the steering state of the steering section 4 may be swung right and left by a state of the road surface. However, since the display control section 14d does not execute the superimpose-display of the rear wheel width trajectory 36 in the steering angle that is less than the predetermined value, it is possible to suppress discomfort given to the user due to excessive display.

Figure 8:
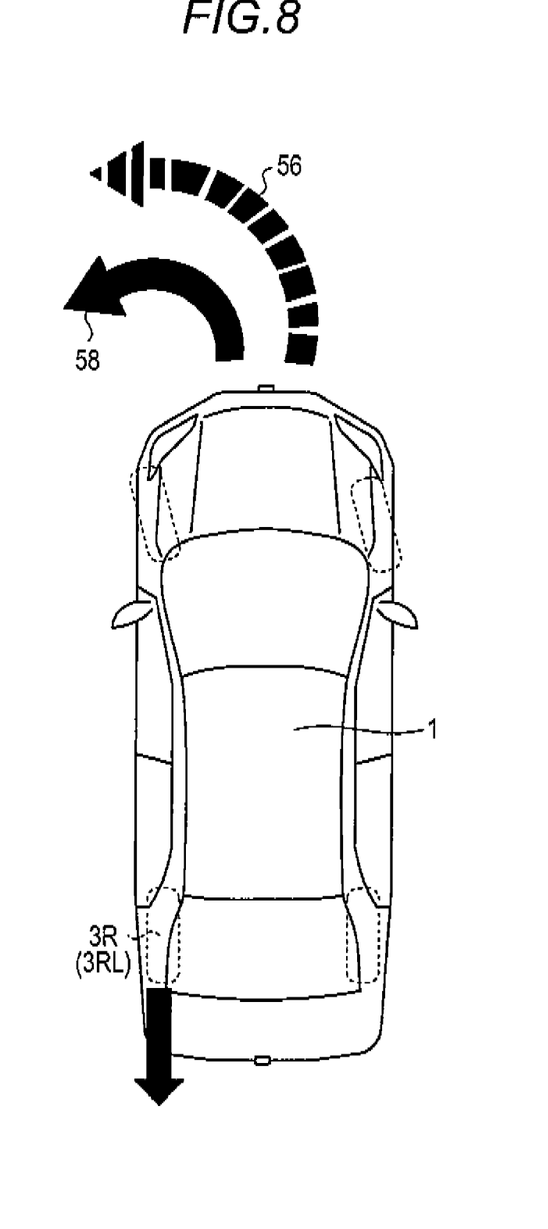
FIG. 8 is an explanatory view illustrating an occurrence state of a braking force and a turning state of the vehicle in a case where turning correction control is performed to reduce a turning radius of the vehicle.

However, as described above, if the braking force is generated in the rear wheel 3R on the inside of turning when the vehicle 1 is turned, turning can be performed with a radius that is smaller than the turning radius determined by the steering angle. For example, as illustrated in FIG. 8, if the turning operation is performed in a state of non-braking, turning is performed in a trajectory indicated by a dotted line arrow 56. On the other hand, for example, if the braking force is applied only to the left rear wheel 3RL when turning to the left, the vehicle 1 behaves so as to rotate about the left rear wheel 3RL and as indicated by a solid line arrow 58, turning is performed in a trajectory that is smaller than that during non-braking. As described above, if the braking control is executed during turning, the rear wheel width trajectory 36 that is determined according to the steering angle and the real moving directions of the left rear wheel 3RL may be different from each other. That is, reliability of the rear wheel width trajectory 36 calculated based on the steering angle may be lowered.

Figure 9:
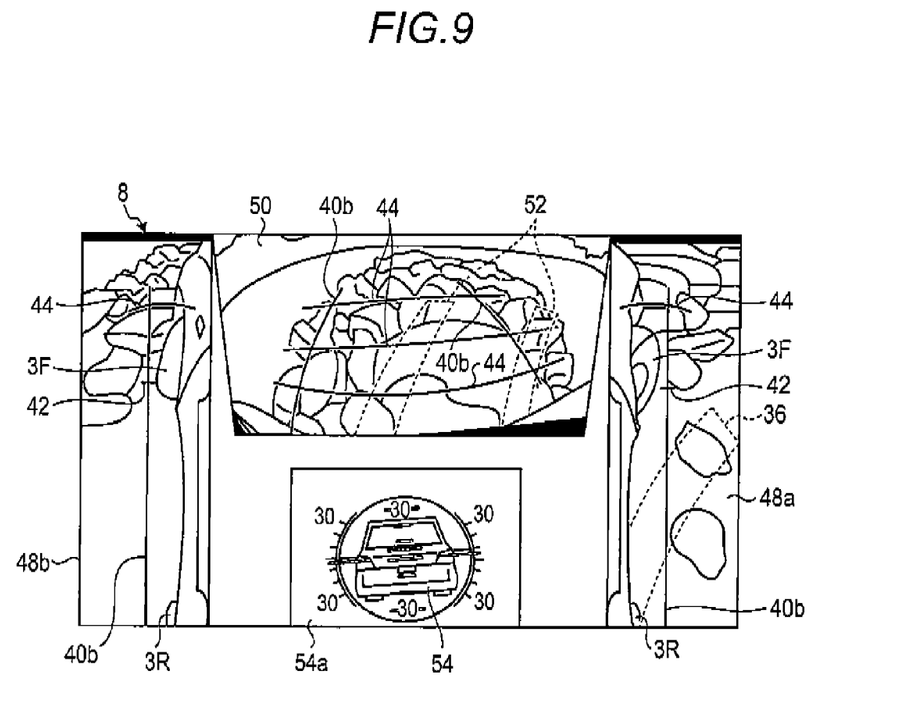
FIG. 9 is a display example of the display device illustrating a mode of the rear wheel width trajectory that is superimpose-displayed on the side image of a case where the turning correction control of FIG. 8 is executed.

Then, if a signal indicating execution of the braking control of the rear wheel on the inside of turning is acquired from the braking state acquisition section 34 during the turning operation (see FIG. 4), as illustrated in FIG. 9, the display control section 14d may superimpose-display the rear wheel width trajectory 36, for example, in a dotted line mode or superimpose-display the rear wheel width trajectory 36 in a semi-transparent mode. That is, a display mode of at least the rear wheel width trajectory 36 is changed if a turning predicted state based on the steering angle and an actual turning state of the vehicle 1 correspond to each other and do not correspond to each other, and thereby an effect that the display reliability of the rear wheel width trajectory 36 is lowered is notified to the user. Similarly, since the moving predicted path is calculated based on the steering angle, the reliability of the front wheel width trajectory 52 is also lowered if the turning radius is changed by the braking control. Thus, if the braking control of the rear wheel on the inside of turning is executed, also for the front wheel width trajectory 52, the user may be alerted by switching the display to the display of the dotted line mode or the semi-transparent mode. In addition, a message or a mark of the alert indicating that the display reliability of the rear wheel width trajectory 36 or the front wheel width trajectory 52 is lowered may be displayed on the display device 8. In addition, the rear wheel width trajectory 36 or the front wheel width trajectory 52 may be displayed in a display color different from during the non-braking and may be blink-displayed. In addition, the display color of the right-side image region 48a (left-side image region 48b) or the front image region 50 may be changed. Furthermore, the user may be alerted by outputting a sound message from the sound output device 9. Moreover, if the posture or the turning direction of the vehicle 1 during the braking control can be calculated based on a detection result of the acceleration sensor 26 or a detection result of another sensor, it is possible to improve the display accuracy of the rear wheel width trajectory 36 or the front wheel width trajectory 52 based on the result. Thus, the superimpose-display may be performed similar to that during non-braking.

Figure 10:
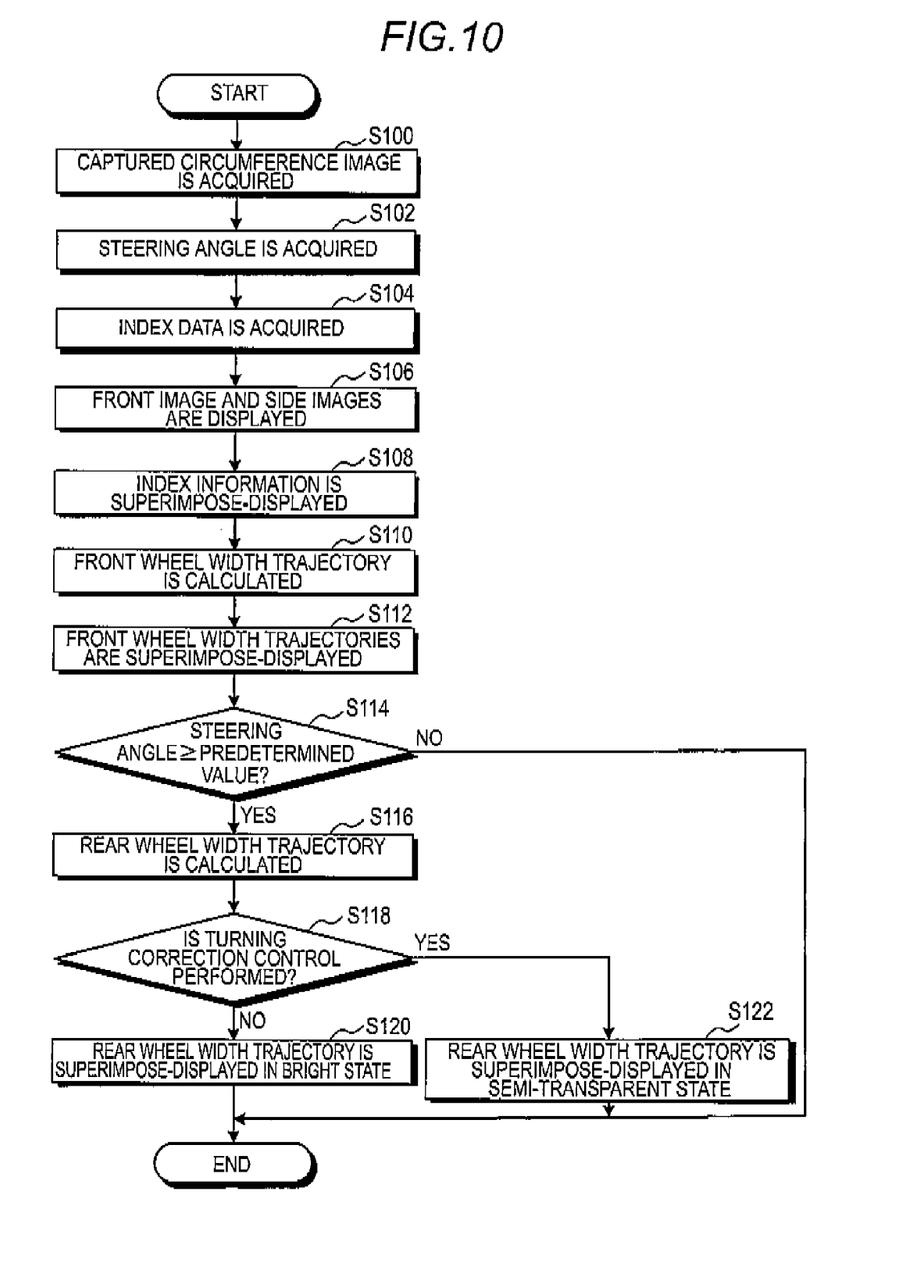
FIG. 10 is a flowchart illustrating a procedure of an imaging process of the vehicle circumference monitoring apparatus according to the embodiment.

An example of the procedure of the imaging process of the circumference monitoring system 100 having such a configuration will be described with reference a flowchart of FIG. 10. Moreover, if the front image region 50 that displays the front image, the right-side image region 48a, or the left-side image region 48b is displayed, the process illustrated in the flowchart of FIG. 10 is repeatedly executed in a predetermined cycle. In addition, each imaging section 16, the steering angle sensor 19, the brake sensor 18h, and the like continuously supply the detection data to the ECU 14 in a predetermined control cycle.

If the display of the display device 8 including the right-side image region 48a, the left-side image region 48b, and the front image region 50 is required, the ECU 14 causes the display control section 14d to acquire the captured image data of the circumference of the vehicle 1 via each imaging section 16 (S100). Sequentially, the steering angle acquisition section 28 acquires a current steering angle based on the detection data of the steering angle sensor 19 (S102). In addition, the index acquisition section 32 reads an index to be displayed to correspond to the current steering angle from the SSD 14f and supplies the index to the display control section 14d (S104). Then, the ECU 14 causes the display control section 14d to respectively display the front image on the front image region 50, the right side image on the right-side image region 48a, and the left side image on the left-side image region 48b (S106), and causes the index information to be superimpose-displayed on each display region (S108).

In addition, the trajectory calculation section 30 calculates the front wheel width trajectory 52 based on the steering angle supplied from the steering angle acquisition section 28 (S110) and the display control section 14d superimpose-displays the calculated front wheel width trajectory 52 on the front image region 50 (S112).

Furthermore, if the steering angle supplied from the steering angle acquisition section 28 is equal to or greater than the predetermined value, for example, equal to or greater than 270° (Yes in S114), the trajectory calculation section 30 calculates the rear wheel width trajectory 36 based on the steering angle (S116). In a case where a signal indicating that the rear wheel on the inside of turning is in the braking control is not received from the braking state acquisition section 34, that is, in a case where the turning correction control is not performed for reducing the turning radius (No of S118), the display control section 14d superimpose-displays the rear wheel width trajectory 36 in a "bright" state (S120). That is, as illustrated in FIG. 6, the rear wheel width trajectory 36 is clearly displayed in the solid line state, the flow is temporarily completed, and the process is repeatedly executed from S100 in the next control cycle. On the other hand, in the process of S118, in a case where the signal indicating that the rear wheel on the inside of turning is in the braking control is received, that is, in a case where the turning correction control is executed for reducing the turning radius (Yes of S118), the rear wheel width trajectory 36 is superimpose-displayed in a semi-transparent state (S122). That is, as illustrated in FIG. 9, the effect that the display reliability of the rear wheel width trajectory 36 is lowered, that is, the rear wheel width trajectory 36 is displayed as a reference display is indicated, the flow is temporarily completed, and the process is repeatedly executed from S100 in the next control cycle.

In the process of S114, if the steering angle supplied from the steering angle acquisition section 28 is less than the predetermined value, for example, is less than 270°, the process of S116 and subsequent steps is skipped, the flow is temporarily completed, and the process is repeatedly executed from S100 in the next control cycle. Moreover, in the process of S120 or S122, if the rear wheel width trajectory 36 is superimpose-displayed, the index information that is superimpose-displayed in the process of S108 may not be displayed. In addition, in another embodiment, only if the rear wheel width trajectory 36 is superimpose-displayed in the "bright" state in the process of S120, the index information that is superimpose-displayed in the process of S108 is not displayed and if the rear wheel width trajectory 36 is superimpose-displayed in the "semi-transparent" state in the process of S122, the display of the index information may be maintained. As described above, the user can more appropriately confirm the situation of the circumference of the vehicle 1 by displaying in highlight display contents to be focused on by the user depending on the situation. Moreover, the flowchart illustrated in FIG. 10 is an example and if the steering angle of the vehicle 1 is equal to or greater than the predetermined value, as long as it is possible to superimpose-display the rear wheel width trajectory 36 on the side captured image data output from the imaging section 16b (imaging section 16d) capturing the side image of the vehicle 1, the process contents may be appropriately changed and it is possible to obtain the same effects as in the embodiment.

A vehicle circumference monitoring apparatus according to an aspect of this disclosure includes, for example, an acquisition section that acquires a steering angle of front wheels of a vehicle; a trajectory calculation section that calculates a rear wheel width trajectory indicating a moving predicted path of a rear wheel of an inside of turning during turning of the vehicle by steering of the front wheels; and a display control section that superimpose-displays the rear wheel width trajectory in captured side image data output from an imaging section that captures side images of the vehicle when the steering angle of the vehicle is equal to or greater a predetermined value. According to the configuration, for example, the rear wheel width trajectory is displayed, if the steering angle is equal to or greater than the predetermined value, for example, in a case where an operation of a steering wheel is greatly performed (for example, 270° or greater). That is, the rear wheel width trajectory is displayed in a case where turning of the vehicle is great and the inner wheel difference is great. In addition, since the rear wheel width trajectory corresponding to the rear wheel width is displayed, prediction of an object on which the rear wheel will run over is made easier and an image in the event that the rear wheel actually runs over the object is easily displayed on the side image, and it is possible to increase driving support with respect to a user.

The display control section of the vehicle circumference monitoring apparatus may, for example, superimpose-display a maximum moving trajectory of the rear wheel of the inside of turning if the steering angle is the maximum angle in the captured side image data when superimpose-displaying the rear wheel width trajectory. According to the configuration, for example, a relationship between the rear wheels and the object on a road when the steering angle is the maximum is easily understood, for example, determination of a change amount when a moving direction of the rear wheels is changed is easily performed, and it is possible to increase the driving support with respect to the user.

The display control section of the vehicle circumference monitoring apparatus may, for example, superimpose-display an index indicating exterior information of the vehicle in the captured side image data if at least the steering angle of the vehicle is less than a predetermined value. According to the configuration, for example, if the steering angle is less than the predetermined value without the necessity to heavily consider the moving direction of the rear wheels and the like, it is possible to simplify the superimpose-display of the side image, it is possible to display the exterior information of the vehicle, for example, information necessary during driving of the vehicle such as a vehicle width and a grounding position of the wheels of the vehicle, and then it is possible to increase the driving support with respect to the user.

The trajectory calculation section of the vehicle circumference monitoring apparatus may, for example, further calculate a front wheel width trajectory indicating a moving predicted path of the front wheels of the vehicle and the display control section may superimpose-display the front wheel width trajectory in captured front image data output from an imaging section that captures a front image of the vehicle. According to the configuration, for example, the display of the moving predicted path of the front wheels is displayed in addition to the moving predicted path of the rear wheels and then it is possible to realize the driving support such as enabling posture control of the vehicle in further detail.

The display control section of the vehicle circumference monitoring apparatus may, for example, change a display mode of at least the rear wheel width trajectory if a turning predicted state based on the steering angle and an actual turning state of the vehicle correspond to each other and do not correspond to each other. According to the configuration, if turning performance of the vehicle is adjusted by executing steering control and other controls such as braking control during turning of the vehicle by a combination therebetween, it is possible to easily notify the user of the occurrence of a difference in the turning predicted state based on the steering angle and the actual turning state of the vehicle by changing the display mode, and it is possible to increase the driving support with respect to the user.

The embodiment and the modification example of this disclosure are described, but the embodiment and the modification example are presented as examples, and are not intended to limit the scope of this disclosure. Theses novel embodiments are capable of being embodied in other various forms and various omissions, substitutions, and changes can be performed without departing from the scope of this disclosure. These embodiments or modifications are included in the scope or the gist of this disclosure, and are included in the invention described in the claim and equivalents thereof.

What is claimed is:

1. A vehicle circumference monitoring apparatus comprising:
   a steering angle sensor that detects a steering angle of front wheels of a vehicle;
   an electronic control unit, including
   a memory;

a processing unit including a trajectory calculation section that calculates a rear wheel width trajectory indicating a moving predicted path of a rear wheel during turning of the vehicle based on the detected steering angle of the front wheels, the rear wheel being located at a side of the vehicle to which the vehicle is turning; and a display control section that:

superimpose-displays the rear wheel width trajectory with captured side image data output from an imaging section that captures side images of the vehicle when the steering angle is equal to or greater than a predetermined value, and displays the captured side image data regardless of the steering angle of the front wheels.

2. The vehicle circumference monitoring apparatus according to claim 1, wherein the display control section superimpose-displays a maximum moving trajectory of the rear wheel of the inside of turning when the steering angle is a maximum angle in the captured side image data when superimpose-displaying the rear wheel width trajectory.

3. The vehicle circumference monitoring apparatus according to claim 2, wherein the display control section superimpose-displays an index indicating exterior information of the vehicle in the captured side image data if at least the steering angle of the vehicle is less than the predetermined value.

4. The vehicle circumference monitoring apparatus according to claim 3, wherein the trajectory calculation section further calculates a front wheel width trajectory indicating a moving predicted path of the front wheels of the vehicle and the display control section superimpose-displays the front wheel width trajectory in captured front image data output from an imaging section that captures a front image of the vehicle.

5. The vehicle circumference monitoring apparatus according to claim 4, wherein the display control section implements a first display mode for the rear wheel width trajectory in a case where a turning predicted state based on the steering angle and an actual turning state of the vehicle correspond to each other, and the display control section implements a second display mode for the rear wheel width trajectory in a case where the turning predicted state and the actual turning state do not correspond to each other.

6. The vehicle circumference monitoring apparatus according to claim 3, wherein the display control section implements a first display mode for the rear wheel width trajectory in a case where a turning predicted state based on the steering angle and an actual turning state of the vehicle correspond to each other and the display control section implements a second display mode for the rear wheel width trajectory in a case where the turning predicted state and the actual turning state do not correspond to each other.

7. The vehicle circumference monitoring apparatus according to claim 2, wherein the trajectory calculation section further calculates a front wheel width trajectory indicating a moving predicted path of the front wheels of the vehicle and the display control section superimpose-displays the front wheel width trajectory in captured front image data output from an imaging section that captures a front image of the vehicle.

8. The vehicle circumference monitoring apparatus according to claim 7, wherein the display control section implements a first display mode for the rear wheel width trajectory in a case where a turning predicted state based on the steering angle and an actual turning state of the vehicle correspond to each other, and the display control section implements a second display mode for the rear wheel width trajectory in a case where the turning predicted state and the actual turning state do not correspond to each other.

9. The vehicle circumference monitoring apparatus according to claim 2, wherein the display control section implements a first display mode for the rear wheel width trajectory in a case where a turning predicted state based on the steering angle and an actual turning state of the vehicle correspond to each other, and the display control section implements a second display mode for the rear wheel width trajectory in a case where the turning predicted state and the actual turning state do not correspond to each other.

10. The vehicle circumference monitoring apparatus according to claim 1, wherein the display control section superimpose-displays an index indicating exterior information of the vehicle in the captured side image data if at least the steering angle of the vehicle is less than the predetermined value.

11. The vehicle circumference monitoring apparatus according to claim 10, wherein the trajectory calculation section further calculates a front wheel width trajectory indicating a moving predicted path of the front wheels of the vehicle and the display control section superimpose-displays the front wheel width trajectory in captured front image data output from an imaging section that captures a front image of the vehicle.

12. The vehicle circumference monitoring apparatus according to claim 11, wherein the display control section implements a first display mode for the rear wheel width trajectory in a case where a turning predicted state based on the steering angle and an actual turning state of the vehicle correspond to each other, and the display control section implements a second display mode for the rear wheel width trajectory in a case where the turning predicted state and the actual turning state do not correspond to each other.

13. The vehicle circumference monitoring apparatus according to claim 10, wherein the display control section implements a first display mode for the rear wheel width trajectory in a case where a turning predicted state based on the steering angle and an actual turning state of the vehicle correspond to each other, and the display control section implements a second display mode for the rear wheel width trajectory in a case where the turning predicted state and the actual turning state do not correspond to each other.

14. The vehicle circumference monitoring apparatus according to claim 1, wherein the trajectory calculation section further calculates a front wheel width trajectory indicating a moving predicted path of the front wheels of the vehicle and the display control section superimpose-displays the front wheel width trajectory in captured front image data output from an imaging section that captures a front image of the vehicle.

15. The vehicle circumference monitoring apparatus according to claim 14,
    wherein the display control section implements a first display mode for the rear wheel width trajectory in a case where a turning predicted state based on the steering angle and an actual turning state of the vehicle correspond to each other, and
    the display control section implements a second display mode for the rear wheel width trajectory in a case where the turning predicted state and the actual turning state do not correspond to each other.

16. The vehicle circumference monitoring apparatus according to claim 1,
    wherein the display control section implements a first display mode for the rear wheel width trajectory in a case where a turning predicted state based on the steering angle and an actual turning state of the vehicle correspond to each other, and
    the display control section implements a second display mode for the rear wheel width trajectory in a case where the turning predicted state and the actual turning state do not correspond to each other.

17. The vehicle circumference monitoring apparatus according to claim 1, wherein the display control section does not superimpose-display the rear wheel width trajectory with the captured side image data when the steering angle is less than the predetermined value.

* * * * *